United States Patent
Leppert et al.

(10) Patent No.: US 8,661,033 B2
(45) Date of Patent: Feb. 25, 2014

(54) SYSTEM TO PROVIDE SEARCH RESULTS VIA A USER-CONFIGURABLE TABLE

(75) Inventors: Greg Leppert, Austin, TX (US); Roji John, Austin, TX (US); Tyron Jerrod Stading, Austin, TX (US)

(73) Assignee: Innography, Inc., Austin, TX (US)

( * ) Notice: Subject to any disclaimer, the term of this patent is extended or adjusted under 35 U.S.C. 154(b) by 261 days.

(21) Appl. No.: 12/415,565

(22) Filed: Mar. 31, 2009

(65) Prior Publication Data
US 2010/0251145 A1 Sep. 30, 2010

(51) Int. Cl.
*G06F 17/30* (2006.01)

(52) U.S. Cl.
USPC .......................................... 707/732

(58) Field of Classification Search
USPC ..................... 707/732, 737; 715/762, 765
See application file for complete search history.

(56) References Cited

U.S. PATENT DOCUMENTS

| | | | |
|---|---|---|---|
| 5,247,666 A | 9/1993 | Buckwold | |
| 5,418,946 A | 5/1995 | Mori | |
| 5,546,529 A | 8/1996 | Bowers et al. | |
| 5,644,740 A | 7/1997 | Kiuchi | |
| 5,675,710 A | 10/1997 | Lewis | |
| 5,784,061 A | 7/1998 | Moran et al. | |
| 5,790,121 A | 8/1998 | Sklar et al. | |
| 5,889,523 A | 3/1999 | Wilcox et al. | |
| 6,226,408 B1 | 5/2001 | Sirosh | |
| 6,321,251 B1 | 11/2001 | Deisinger et al. | |
| 6,760,720 B1 | 7/2004 | De Bellis | |
| 6,983,275 B2 | 1/2006 | Koo et al. | |
| 7,085,761 B2 | 8/2006 | Shibata | |
| 7,146,356 B2 | 12/2006 | Choi et al. | |
| 7,302,423 B2 | 11/2007 | De Bellis | |
| 7,574,432 B1 | 8/2009 | De Bellis | |
| 2004/0002945 A1 | 1/2004 | Shibata | |
| 2004/0088241 A1 | 5/2004 | Rebane et al. | |
| 2004/0186826 A1 | 9/2004 | Choi et al. | |
| 2005/0222987 A1 | 10/2005 | Vadon | |
| 2006/0064408 A1 | 3/2006 | Enbutsu et al. | |
| 2007/0100842 A1 | 5/2007 | Wykes et al. | |
| 2007/0226640 A1* | 9/2007 | Holbrook et al. | 715/765 |
| 2008/0046462 A1* | 2/2008 | Kaufman et al. | 707/102 |
| 2008/0059445 A1 | 3/2008 | De Bellis | |
| 2008/0065612 A1 | 3/2008 | De Bellis | |
| 2008/0154879 A1 | 6/2008 | Lin | |
| 2009/0083545 A1 | 3/2009 | Heim | |
| 2009/0172514 A1 | 7/2009 | Radovanovich | |

* cited by examiner

*Primary Examiner* — Huawen Peng
(74) *Attorney, Agent, or Firm* — Cesari & Reed LLP; R. Michael Reed

(57) ABSTRACT

In a particular embodiment, a graphical user interface (GUI) generated by a processor of a search system includes a search results window operable to display a set of search results within a table that includes a plurality of sub-tables corresponding to a plurality of categories. Each sub-table represents at least one category and includes a respective subset of the set of search results. The GUI further includes a plurality of local control elements, where each local control element is associated with a respective sub-table of the plurality of sub-tables. Each local control element is accessible to a user to selectively sort the respective subset of the set of search results within the respective sub-table according to a user-selected local sort parameter without altering a sort order of respective subsets of the set of search results within other sub-tables of the plurality of sub-tables.

25 Claims, 6 Drawing Sheets

SYSTEM TO PROVIDE SEARCH RESULTS VIA A USER-CONFIGURABLE TABLE

FIELD

The present disclosure is generally related to a system to provide search results via a user-configurable table. More particularly, but not by limitation, the present disclosure is related to a system adapted to produce a graphical user interface including a table having search results organized into subsets within sub-tables, which subsets are independently configurable based on user selections.

BACKGROUND

The Internet is a world-wide network of computer resources, which are accessible via standardized communications protocols, such as transport control protocol (TCP)/Internet Protocol (IP). The scalability of the Internet provides access to nearly limitless data resources; however, the volume of available data makes data retrieval and data processing a growing challenge. While visualizations, such as graphs and charts, are sometimes utilized to display information in a form that can be readily reviewed and understood, such visualizations may not provide a useful rendering of particular search results. For example, in a document space, such as patent searching, a list of found documents (by itself) can require substantial review time by a user to derive meaningful information. While grouping such documents by corporation or by some other category may provide useful insights into the data, such groupings may be arbitrary and may not assist a particular reviewer. Accordingly, there is a need for improvements in the presentation of search results to a user.

SUMMARY

In a particular embodiment, a graphical user interface (GUI) generated by a processor of a search system includes a search results window operable to display a set of search results within a table that includes a plurality of sub-tables corresponding to a plurality of categories. Each sub-table represents at least one category and includes a respective subset of the set of search results. The GUI further includes a plurality of local control elements, where each local control element is associated with a respective sub-table of the plurality of sub-tables. Each local control element is accessible to a user to selectively sort the respective subset of the set of search results within the respective sub-table according to a user-selected local sort parameter without altering a sort order of respective subsets of the set of search results within other sub-tables of the plurality of sub-tables.

In another particular embodiment, a system to provide a user-configurable graphical user interface is disclosed that includes a processor and a memory accessible to the processor to store instructions. The instructions include a plurality of instructions executable by the processor to group subsets of a set of search results into a plurality of categories and to generate window including a graphical user interface operable to display a table comprising a plurality of sub-tables. Each sub-table is associated with a particular category of the plurality of categories and includes a subset of the set of search results. The plurality of instructions further includes at least one instruction executable by the processor to generate at least one global control element associated with the table within the generated window, where the at least one global control element is accessible to a user to sort the plurality of sub-tables into a user-selected order in response to user selection of the at least one global control element. Further, the plurality of instructions includes an instruction to generate a plurality of local control elements within the generated window. Each sub-table of the plurality of sub-tables is associated with at least one local control element of the plurality of local control elements. The at least one local control element is accessible to the user to selectively sort the subset of the search results in response to user selection of the at least one local control element and without concurrently sorting subsets within other sub-tables of the plurality of sub-tables.

In still another particular embodiment, a search system includes an interface responsive to a network to receive search results from one or more data sources and includes a visualization generation module to generate a table comprising a plurality of sub-tables related to a respective plurality of categories. The search system further includes an analysis module adapted to group the received search results into subsets of search results related to particular categories of the plurality of categories. Each search result is associated with at least one of the plurality of categories. Further, the search system includes a graphical user interface (GUI) generation module to generate a GUI including the table, where the GUI further includes a first global control element accessible to a user to selectively sort the plurality of sub-tables into a first user-selected order based on the respective plurality of categories. The GUI also includes a first local control element associated with a first sub-table of the plurality of sub-tables. The first local control element is accessible to the user to selectively sort a first subset of the search results associated with the first sub-table without altering a second subset of the search results within a second sub-table.

DETAILED DESCRIPTION OF ILLUSTRATIVE EMBODIMENTS

Figure 1:
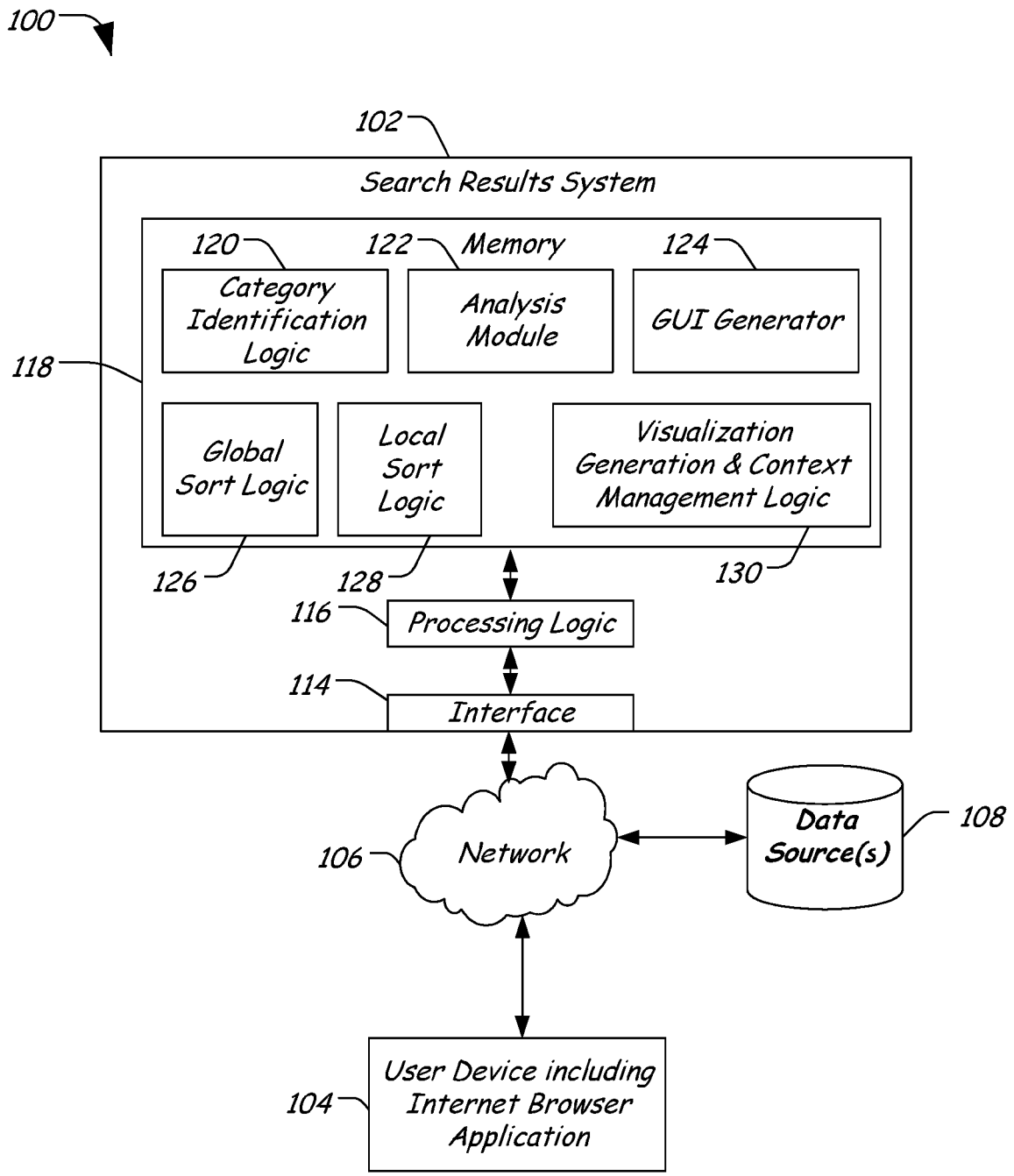
FIG. 1 is a particular illustrative embodiment of a server-based search system to provide search results via a user-configurable table.

FIG. 1 is a particular illustrative embodiment of a server-based search system 100 to provide search results via a user-configurable table. The system 100 includes a search results system 102 that can communicate with one or more user devices, such as a user device including an Internet browser application 104, via a communications network 106, such as the Internet. In a particular embodiment, the user device 104 can be a personal computer, a personal digital assistant (PDA), a wireless telephone with multi-media (Audio, video, and text) capabilities, a portable electronic device with communications functionality and a display, another electronic device, or any combination thereof. In a particular embodiment, the search results system 102 may also communicate with one or more data sources 108 via the network 106. In a particular example, the one or more data sources 108 can include search engines, web pages, subscription databases, other sources, or any combination thereof.

The search results system 102 includes an interface 114 that is responsive to the network 106 to receive search results and to provide data related to a graphical user interface to the user device 104. The search results system 102 also includes processing logic 116 that is coupled to the interface 114 and to a memory 118. In a particular embodiment, the processing logic 116 can be a processor of a server computer. In another particular embodiment, the processing logic 116 can be distributed across multiple server devices, and the memory 118 may also be confined within a single server or distributed across multiple server devices. As used herein, the term "server" is used to refer to a computing device that is adapted to host information and to allow access to the information by other systems or users. In some instances, the term server may also include proprietary systems, such as subscription databases, enterprise systems, other proprietary data sources, or any combination thereof.

The memory 118 includes a plurality of instructions that are executable by the processing logic 116 to provide search results via a user-configurable table. In a particular embodiment, the memory 118 includes a category identification logic module 120 that is executable by the processing logic 116 to associate a subset of a set of search results with a particular category. The particular categories can be selected dynamically from the set of search results. In a particular example, the category identification logic module 120 can extract categories from the set of search results, such as company names, key words, other data, or any combination thereof. Alternatively, the category identification logic module 120 can utilize pre-define categories, such as industry classifications, document classifications, document source data, other information, or any combination thereof.

The memory 118 further includes an analysis module 122 that is executable by the processing logic 116 to process received search results and to retrieve related information from other data sources. In a particular embodiment, search results can be processed using the analysis module 122 to extract data and can query additional data sources based on the extracted data to augment the search results. For example, search results may include a list of patent documents, which can be analyzed using the analysis module 122 to extract assignee names. The analysis module 122 can be used to search a financial database to retrieve data associated with the extracted assignee names, which financial data can be bundled with the list of patent documents to augment the search results.

The memory 118 also includes a graphical user interface (GUI) generator 124 that is executable by the processing logic 116 to produce a graphical user interface, including data related to the search results and including one or more user selectable control elements, such as buttons, pull-down menus, text fields, and other selectable elements. The memory 118 further includes a global sort logic module 126 and a local sort logic module 128, which are executable by the processing logic 116 to sort the data within the graphical user interface. In a particular embodiment, the graphical user interface is produced via the GUI generator 124 that includes a table having multiple sub-tables and that includes a user-selectable global control element associated with the table that can be accessed by a user to alter a sort order of the entire table. Further, the graphical user interface can include multiple user-selectable local control elements that are associated with the sub-tables for selectively sorting data within a particular sub-table without altering data associated with other sub-tables. The memory 118 further includes visualization generation and context management logic 130 executable by the processing logic 116 to switch between particular visualizations, such as the visualizations illustrated in FIGS. 3-5 below. In a particular embodiment, the graphical user interface includes a user-selectable visualization control element that is accessible to a user to selectively access the visualization generation and context management logic 130 to switch between visualizations within the graphical user interface without losing context. For example, a particular set of search results can be viewed in a list form, in a table with multiple sub-tables organized according to categories, in a geographical map form, in an industry classification map, in a document cluster map, in other graphical forms, or any combination thereof. In a particular example, the set of search results can be displayed in multiple different ways without losing the context, namely the underlying set of search results.

During operation, the user device 104 may access a graphical user interface via the network 106, which graphical user interface includes a search input for receiving query terms. A user may utilize the user device 104 to enter a query and to submit the query to the search results system 102. The search system 102 may process the query and retrieve corresponding search results from a variety of sources, including from a database (not shown) stored in the memory 118 and including other data sources 108 via the network 106. Upon receiving search results from multiple sources, the search results system 102 uses the analysis module 122 to assemble the search results into a set of search results, to extract data from the set of search results and to utilize the extracted data to augment the set of search results with ancillary information. For example, if the search involves patent documents, the ancillary information can include financial data related to companies associated with the set of search results.

The analysis module 122 is used to assemble the set of search results. The search results system 102 can use the category identification logic module 120 and the analysis module 122 to identify subsets of the set of search results that are related to particular categories. The GUI generator 124 generates a graphical user interface including a table having multiple sub-tables. Each sub-table is associated with a particular category of the plurality of categories. The GUI generator 124 populates each sub-table with a particular sub-set of the set of search results. Further, the GUI generator 124 generates a plurality of user selectable control elements, including at least one global control element that can be accessed by a user to selectively alter an ordering of the sub-tables within the table. The plurality of user-selectable control elements further includes user-selectable control elements. In a particular example, each sub-table has at least one associated user-selectable local control element that can be accessed by a user to selectively alter an arrangement of the sub-set of the set of search results without altering other sub-sets of the set of search results. For example, a first sub-table may be sorted alphabetically by title based on user selection of a first local control element, a second sub-table may be sorted by document date based on user selection of a second local control element, and a third sub-table may be sorted by document identifiers based on user selection of a third local control element.

It should be understood that, depending on the particular categorization of the data, some search results may be organized into multiple subsets of the set of search results. For example, if the selected categories are subject classifications, there may be significant overlap between selected categories, such that a given search result may fit within multiple subject classifications. In another particular example, many of the documents may be unique to a particular category, such as where the selected categories are based on companies (assignees in the patent context). In a particular embodiment, the GUI generator 124 may include a user-selectable global control element that is accessible to a user to selectively switch between categories so that the same set of search results can be viewed in different ways within the table.

Figure 2:
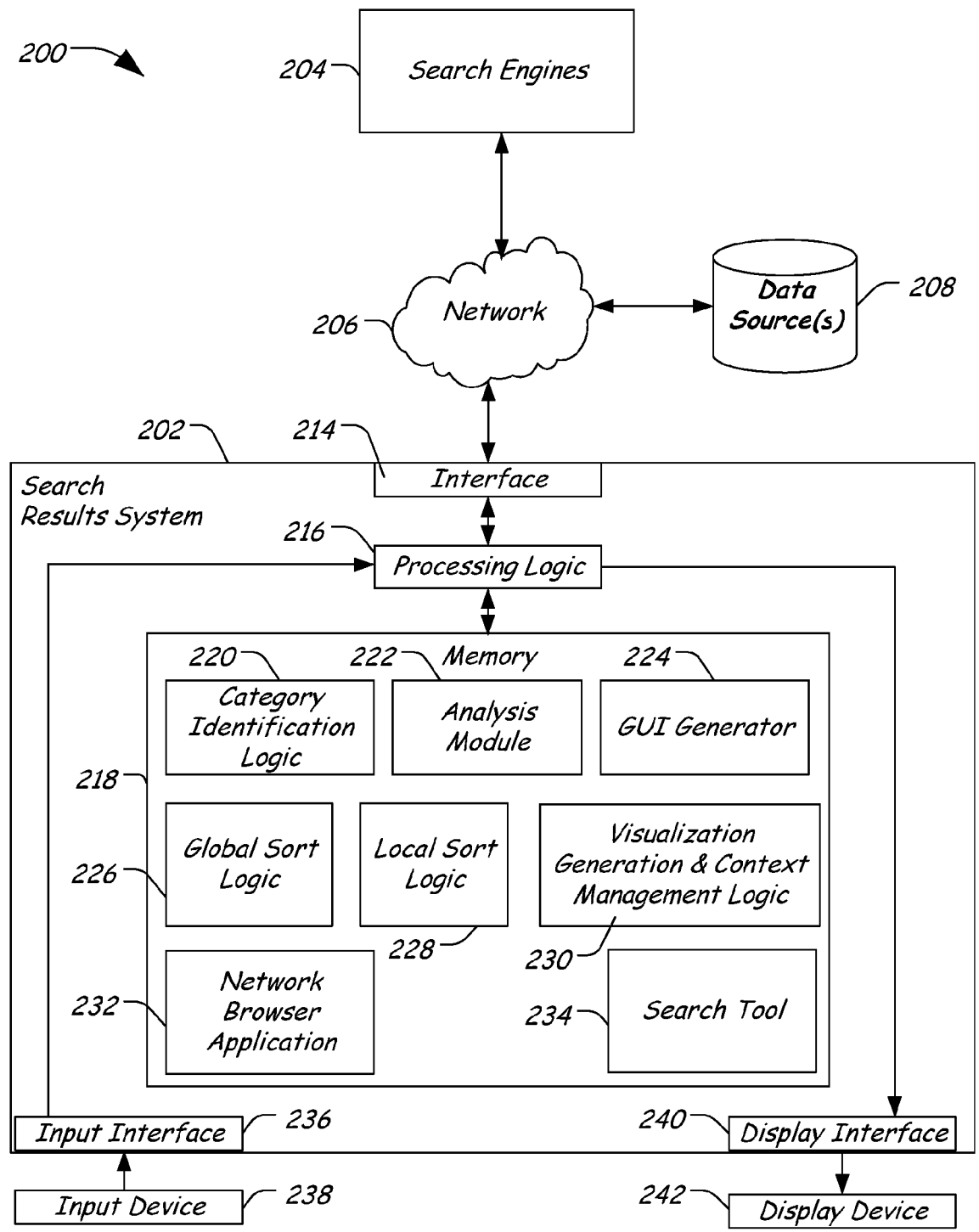
FIG. 2 is a particular illustrative embodiment of a search system to provide search results via a user-configurable table.

FIG. 2 is a particular illustrative embodiment of a search system 200 to provide search results via a user-configurable table. The search system 200 includes a search results system 202 that communicates with one or more search engines 204 and one or more data sources 208 via a network 206, such as the Internet. In a particular example, the search results system 202 can be a personal computer, a personal digital assistant (PDA), a mobile telephone with processing capability, another electronic device, or any combination thereof.

The search results system 202 includes an interface responsive to the network 214 and adapted to send and receive data via the network 206. The search results system 202 further includes processing logic 216, such as a processor, that is coupled to the interface 214 and to a memory 218. The search results system 202 further includes an input interface 236 that is adapted to receive user inputs from an input device 238, such as a keyboard, a keypad, a pointer, a stylus, a touch screen, another input device, or any combination thereof. Further, the search results system 202 includes a display interface 240 that is adapted to communicate with a display device 242, such as a computer monitor, a liquid crystal display (LCD), another display device, or any combination thereof.

The memory 218 includes a plurality of instructions that are executable by the processing logic 216 to provide search results via a user-configurable table. In a particular embodiment, the memory 218 includes a category identification logic module 220 that is executable by the processing logic 216 to associate a subset of a set of search results with a particular category. The particular categories can be selected dynamically from the set of search results. In a particular example, the category identification logic module 220 can extract categories from the set of search results, such as company names, key words, other data, or any combination thereof. Alternatively, the category identification logic module 220 can utilize pre-define categories, such as industry classifications, document classifications, document source data, other information, or any combination thereof.

The memory 218 further includes an analysis module 222 that is executable by the processing logic 216 to process received search results and to retrieve related information from other data sources. In a particular embodiment, search results can be processed using the analysis module 222 to extract data and can query additional data sources based on the extracted data to augment the search results. For example, search results may include a list of patent documents, which can be analyzed using the analysis module 222 to extract assignee names. The analysis module 222 can be used to search a financial database to retrieve data associated with the extracted assignee names, which financial data can be bundled with the list of patent documents to augment the search results.

The memory 218 also includes a graphical user interface (GUI) generator 224 that is executable by the processing logic 216 to produce a graphical user interface, including data related to the search results and including one or more user selectable control elements, such as buttons, pull-down menus, text fields, and other selectable elements. The memory 218 further includes a global sort logic module 226 and a local sort logic module 228, which are executable by the processing logic 216 to sort the data within the graphical user interface. In a particular embodiment, the graphical user interface is produced via the GUI generator 224 that includes a table having multiple sub-tables and that includes a user-selectable global control element associated with the table that can be accessed by a user to alter a sort order of the entire table. Further, the graphical user interface can include multiple user-selectable local control elements that are associated with the sub-tables for selectively sorting data within a particular sub-table without altering data associated with other sub-tables. The memory 218 further includes visualization generation and context management logic 230 executable by the processing logic 216 to switch between particular visualizations, such as the visualizations illustrated in FIGS. 3-5 below. In a particular embodiment, the graphical user interface includes a user-selectable visualization control element that is accessible to a user to selectively access the visualization generation and context management logic 230 to switch between visualizations within the graphical user interface without losing context. For example, a particular set of search results can be viewed in a list form, in a table with multiple sub-tables organized according to categories, in a geographical map form, in an industry classification map, in a document cluster map, in other graphical forms, or any combination thereof. In a particular example, the set of search results can be displayed in multiple different ways without losing the context, namely the underlying set of search results.

The memory 218 also includes a search tool 234, which may include logic for query expansion and that may include links to a variety of proprietary data sources in addition to publicly accessible data sources, such that a set of search results can include publicly available information and proprietary information. In this particular example, the search results system 202 can be a user's system within an enterprise, a server within a corporation, a hand-held device, or any combination thereof.

In a particular example, the search results system 202 can be accessed by a user to initiate a search via keywords. The search tool 234 is used to expand the query and to submit the query to multiple search engines 204 and data sources 208 via the network 206. The search tool 234 may also submit related queries to local data sources (not shown). The search results are provided to the processing logic 216, which uses the analysis module 222 to extract data from the search results. The extracted data can be used for ancillary searches. Further, the processing logic 216 uses category identification logic 220 to organize subsets of the search results into selected categories. Further, the processing logic 216 uses the GUI generator 224 to produce a graphical user interface including a table, which includes sub-tables, where each sub-table contains a subset of the search results. Further the GUI generator 224 includes at least one user-selectable global control element to alter an order of the sub-tables within the graphical user interface. Further, the GUI generator 224 includes multiple user-selectable local control elements, where each sub-table has at least one user-selectable local control element to selectively alter an order of the subset of search results within the particular sub-table, and without altering the order of subsets of the search results within other sub-tables.

Further, the GUI generator 224 can insert a global classification control element that is accessible to a user to selectively alter the categories into which the particular search results are grouped. In an embodiment, the categories are pre-defined categories. In another embodiment, the categories are user-defined. In yet another embodiment, the categories are dynamically generated from the search results.

Figure 3:
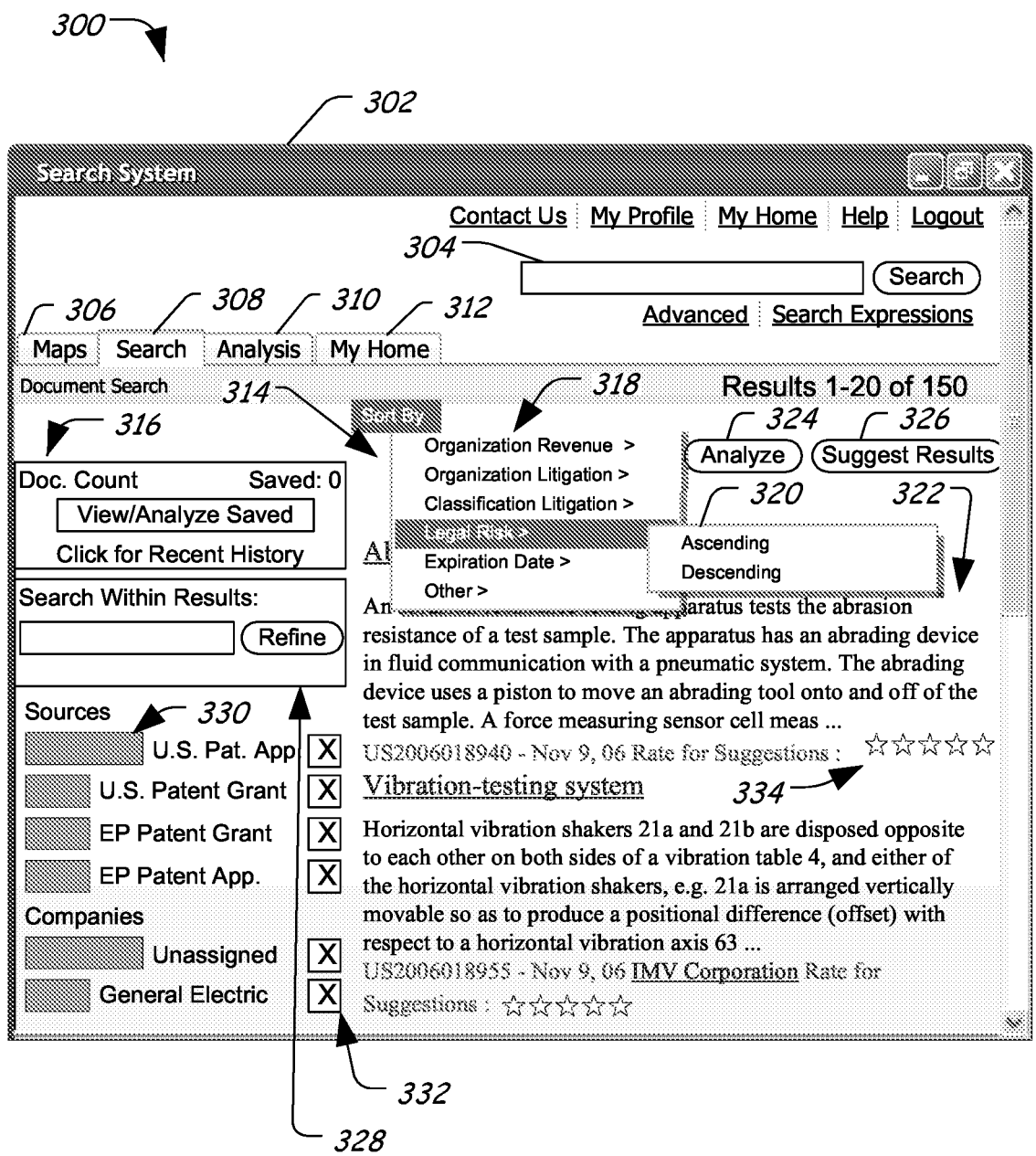
FIG. 3 is a first particular illustrative embodiment of a graphical user interface (GUI) including search results displayed in a list and including user selectable control elements.

FIG. 3 is a first particular illustrative embodiment of a graphical user interface (GUI) 300 including search results displayed in a list and including user selectable control elements. The graphical user interface 300 includes a window 302. The window 302 includes a search text input 304 and multiple user selectable tabs, including a "Maps" tab 306, a "Search" tab 308, an "Analysis" tab 310, and a "My Home" tab 312. In this particular instance, the "Search" tab 308 is selected to display a search panel 314. The search panel 314 includes a drop-down menu 318 and a control panel 316. Further, the search panel 314 includes a list of search results 322. Each search result of the list of search results 322 is associated with selectable indicators, such as the selectable indicators 334 for rating the search result on a scale of one to five stars (i.e. from "not relevant" to "relevant"). The selectable indicators 334 are illustrative of one possible rating system. In a particular illustrative embodiment, the selectable indicators 334 may be check boxes, radio buttons, other selectable objects, or any combination thereof. In another particular illustrative embodiment, the selectable indicators 334 may be replaced with a numeric text input, a sliding bar (an adjustable element), another input type, or any combination thereof. The selectable indicators 334 allow the user to provide explicit feedback to the search system, which can use the explicit feedback to train a query learner and a document learner and to reverse engineer the search to produce new queries.

In a particular illustrative embodiment, the contents of the control panel 316 are dynamically generated by the search system based on the list of search results 322. The control panel 316 includes statistical information, such as a bar 330 that represents a relative number of documents associated with a particular category from the search results, e.g., "United States Patent Applications." Additionally, each category may include a selectable option 332, which a user may select to filter out search results that correspond to a particular category. Further, the control panel 316 includes a refine search box 328, which can be used to refine particular search results by adding additional search terms.

In a particular illustrative example, if a user selects the selectable option 332 that is associated with the category "U.S. patent application," the list of search results 322 would be adjusted to remove patent applications from the displayed list. The selectable option 332 may be called a "negation" option. Each category associated with the search results may be separately filtered, such that the user can selectively filter out "unassigned" patents and applications, particular companies, particular types of documents, other categories, or any combination thereof. In a particular illustrative embodiment, other document sources may include commercial databases, governmental databases, other data sources, or any combination thereof, which may be filtered using the selectable options 332 that correspond with the particular category identifying the respective data source. Other categories of the search results may include industry classifications, geographic information, date information, other information, or any combination thereof.

Referring again to FIG. 3, the graphical user interface 300 can include a "SORT BY" menu option 318 that can be accessed by a user to sort items within the list of search results 322. Each item within the list of search results 322 may be related to a particular document. The SORT BY menu option 318 allows the user to sort the items based on information that may or may not be contained within the documents. The "SORT BY" menu option 318 includes an "Organization Revenue" option, an "Organization Litigation" option, a "Classification Litigation" option, an "Expiration Date" option, an "Other" option, and a "Legal Risk" option. The Organization Revenue option allows the user to sort the search results based on revenues of companies that own the document (e.g., assignees of the patent documents). The Organization Litigation option can be accessed to sort the search results based on a litigation history of an organization that owns the document. The Classification Litigation can be accessed to sort the search results based on a litigation history of the classification of the document. For example, a level of litigation activity within a particular classification with which the document is associated (e.g., semiconductor devices). The Expiration Date option can be accessed to sort the search results from a Patent Office (e.g., the United States Patent Office, the European Patent Office, other patent offices, or any combination thereof) based on a calculated expiration date, failure to pay maintenance fees, or invalidation. The search system can also calculate expiration dates for other types of data, such as Small Business Administration Innovative Research grants, which may have a request for proposal expiration date. Further, the search system can determine expiration dates related to Copyrights, Trademarks, user-defined expiration dates (such as an email expiration date), other expiration dates, or any combination thereof.

Other sorting options may include a number of documents associated with an organization or classification, relevancy ratings, date data, financial data, location data, author data, statistical data, reference data, pricing data, credit history, enterprise data, employee data, litigation data, user-provided data, user-defined sorting algorithm, or any combination thereof.

The Legal Risk option can be accessed by a user to sort the search results based on a probabilistic determination of legal risk (e.g., likelihood of a lawsuit, likelihood of a citation by another document, likelihood of licensing opportunities, other factors, or any combination thereof). In a particular illustrative, non-limiting embodiment, the search system can evaluate the legal risk based on patents and patent publications. In such an instance, the legal risk can be based on a number of claims, a number prior art citations, a number of forward references (e.g., references that cite the particular patent), a length of time between filing and grant of the patent, number of figures, number of pages, age of patent, number of inventors and information associated with the inventor (number of patents listing the inventor, distribution of patents within classification system, employment records, number of citations from other patents, number of publications or work outside of patents, other data, or any combination thereof).

Additionally, in such an instance, the legal risk can be based on assignee data, such as litigation history, financial history, entity type (e.g. university, small business, non-profit organization, inventor), local or foreign location, number of patents, number of citations from other publications, number of publications outside of patents, associations with industry standards, number of products, number of inventors, number of employees, other data, or any combination thereof. Also, in such an instance, the legal risk can be based on assignee data or the absence thereof. Further, the legal risk can be based on classification data, including litigation history, number of patents, number of citations, number of inventors, other data, or any combination thereof, within a particular classification. Additionally, the legal risk can be based on location data, including geographic data, logic geographic groupings (such as legal jurisdictions), litigation history data, country-based data (e.g., international laws, country-specific laws, treaties, other groupings, or any combination thereof), financial information, proximity to universities (i.e. proximity to intellectual talent pool), other categories, or any combination thereof. Additionally, the legal risk can be related to user-provided data or user-assigned rankings. In a particular embodiment, any of the above-listed factors may be used in any combination to evaluate legal risk.

In a particular instance, the Legal Risk option can be selected to access an associated submenu 320, from which the user may specify an ascending or a descending order for the sorted results. Depending on which menu option is selected from the SORT BY menu 318, other submenus and related sorting options can be accessed, allowing a user to view the same data in a variety of different ways.

It should be understood that patent searching is illustrated for the sake of simplicity, but that other document sources and types may also be searched and categorized using the search system. Further, it should be understood that the types of categories may depend on the particular search context, and the selectable elements within the control panel 316 may be adjusted dynamically and automatically by the search system based on the context of the search results. Also, it should be understood that the particular listing of the search results within the results panel 314 represents one possible visualization of the search results.

Figure 4:
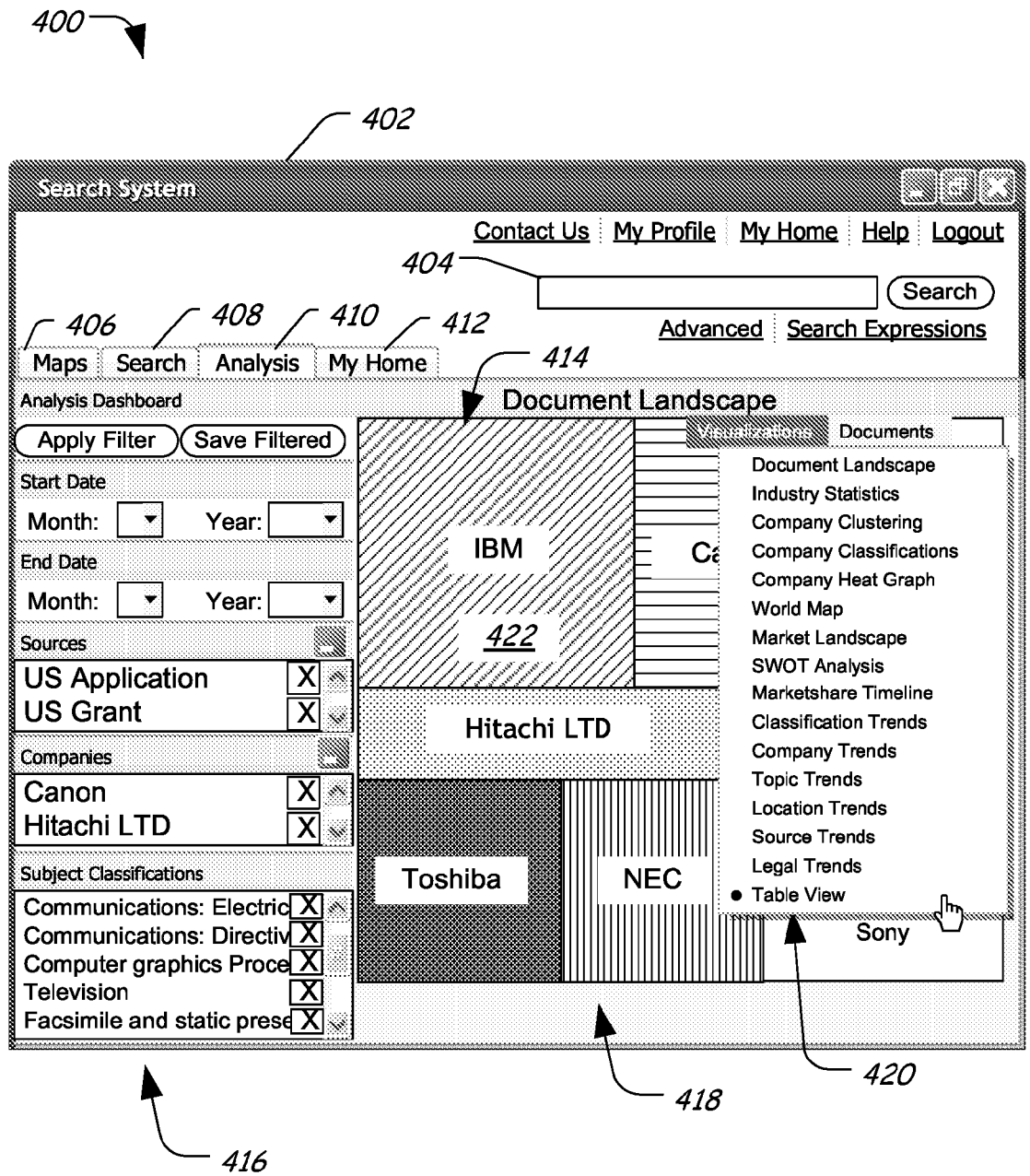
FIG. 4 is a second particular illustrative embodiment of a GUI including a graphical map having objects related to at least one attribute or dimension of a set of search results.

FIG. 4 is a second particular illustrative embodiment of a GUI 400 including a graphical map having objects related to at least one attribute or dimension of a set of search results. The graphical map represents a second possible visualization of the search results. The graphical user interface 400 includes a window 402, which has a search text input 404 and multiple user selectable indicators, including a "Maps" tab 406, a "Search" tab 408, an "Analysis" tab 410, and a "My Home" tab 412. The window 402 further includes a visualization panel 414 to display multiple visualizations of a particular set of search results, such as a document landscape map 418, and includes a control panel 416. The document landscape map 418 includes multiple selectable graphical elements, such as the selectable graphical element 422 to access documents associated with a particular classification or category of the search results. The graphical user interface 400 also includes a menu of selectable options 420 for selecting between visualizations. The available visualizations that can be accessed using the menu of selectable options 420 can include a document landscape visualization, an industry statistics visualization, a company clustering visualization, a company classifications visualization, a company "heat graph" visualization, a world map visualization, a market landscape visualization, a "strengths-weaknesses-opportunities-threats" (SWOT) visualization, a market-share timeline visualization, a classification trends visualization, a company trends visualization, a topic trends visualization, a location trends visualization, a source trends visualization, and a legal trends visualization. Visualizations may be added or omitted, depending on the particular implementation.

In a particular illustrative embodiment, each of the multiple selectable graphic elements, including the selectable graphic element 422, has a size dimension indicating a relative number of documents associated with the particular category of information. Each of the selectable graphic elements may also have a respective color dimension, shading dimension, hatching dimension, or other visual indicator that represents the relative number of documents.

In a particular illustrative embodiment, the control panel 416 provides multiple selectable options, including selectable classification negation options, selectable date options and other options. Selection of one of the selectable classification negation options causes the graphical user interface 400 to display a document landscape 418 that is adjusted according to the selection.

Figure 5:
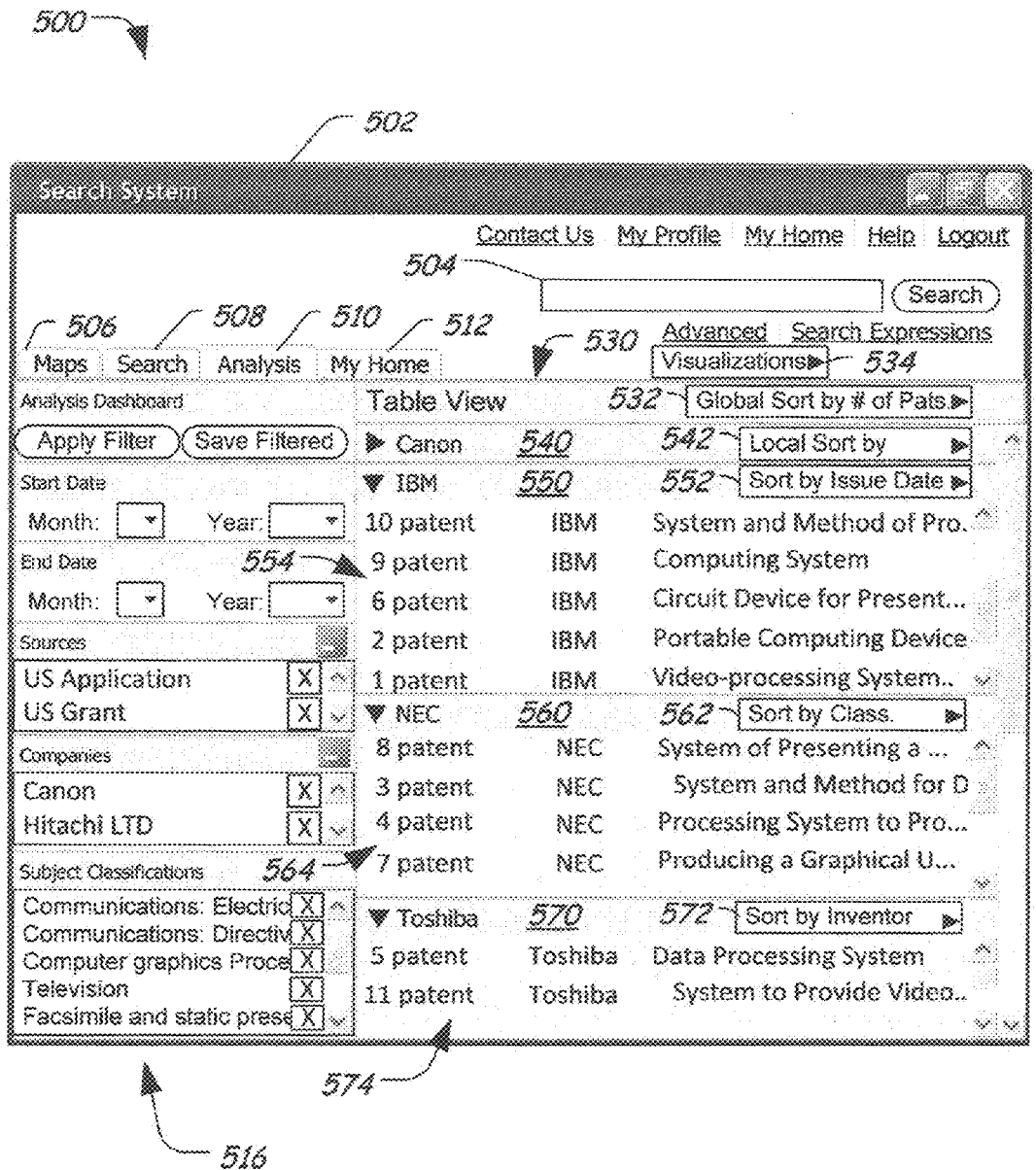
FIG. 5 is a third particular illustrative embodiment of a GUI including a table containing sub-tables associated with categories of a set of search results, where each sub-table includes a subset of the set of search results and where the GUI includes global and local user-selectable control elements to selectively alter an arrangement of data within the table and/or within sub-tables.

FIG. 5 is a third particular illustrative embodiment of a GUI 500 including a window 502 having a table 530 containing sub-tables 540, 550, 560, and 570 associated with categories of a set of search results, where each sub-table 540, 550, 560, and 570 includes a subset of the set of search results (such as subsets 554, 564, and 574). The GUI 500 includes user-selectable global control elements, such as a visualization menu 534 that is accessible to a user to selectively switch between possible visualizations of the search results. In a particular example, the visualizations menu 534 can alter categories within the table 530 and to alter the visualization from a table view to another type of view, such as the list view illustrated in FIG. 3 and the graphical map view illustrated in FIG. 4. Further, the GUI 500 includes a global sort control element 532 to sort the contents of the table 530 including the order of the sub-tables 532. Additionally, the GUI includes local user-selectable control elements 542, 552, 562, and 572, which are adapted to independently sort the associated subset of the search results (such as a subset within the non-expanded sub-table 540, and the subsets 554, 564, and 574 within the sub-tables 550, 560, and 570, respectively) to selectively alter an arrangement of data within the particular sub-table without altering the arrangement of other subsets within other sub-tables.

The window 502 includes a search text input 504 and multiple user selectable tabs, including a "Maps" tab 506, a "Search" tab 508, an "Analysis" tab 510, and a "My Home" tab 512. In this particular instance, the "Search" tab 508 is selected to display a search panel (not shown), which may include simple and advanced search options. The "Maps" tab 506 can be accessed by a user to view various visualizations. The "Analysis" tab 510 may be selected by a user to access various analysis options. The "My Home" tab 512 may be selected by a user to access a variety of account-related information and to access account-specific data and settings.

The window 502 further includes a control panel 516 that includes various user-selectable filters, which can be accessed by a user to filter various search results. The control panel may include negations that can be selected to remove various results from the set of search results within the table 530. Further, the control panel 516 can include other filters, such as date range filters, to selectively filter results from the set of search results. Other filters may also be included within the control panel 516.

In a particular embodiment, the global sort element 532 associated with the table 530 is accessible by a user to selectively sort the plurality of sub-tables 540, 550, 560, and 570 according to a user-selected global sort parameter based on their associated categories of the plurality of categories. For example, the global sort may be based on a number of patents in each category. The categories can be company names. Thus, the order may be determined in descending order from the company that holds the most patents to the company that holds the least patents. Similarly, the global sort control element 532 may be selected to sort the sub-tables 540, 550, 560 and 570 into alphabetical order (by company). In another example, the sub-tables 540, 550, 560, and 570 may be organized by other parameters. In a particular example, instead of using company names for the categories, the categories may be industry classifications, and the sort may be based on the number of search results, the alphabetical industry classification, etc. Any sort order may be applied to the sub-tables, including user-defined sort orders. In a particular embodiment, the global sort control element 534 provides a context-based menu of sorting options related to one or more parameters associated with the set of search results. In the context of patents, the patent issue date may be one of the selectable options. In the context of non-patent results, the patent issue date option may be replaced with a publication date option. Further, in a particular embodiment, the plurality of categories into which the search results are grouped includes company names, industry classifications, document classifications, financial classifications, geographical classifications, types of documents, other classifications, or any combination thereof.

Additionally, each of the user-selectable local control elements 542, 552, 562, and 572 are independently selectable to selectively apply a sorting operation to the subset of data within the particular sub-table without altering a sort order within other sub-tables. For example, a first sub-table 550 may be sorted by patent issue date, while a second sub-table 560 is sorted by patent classification, and a third sub-table is sorted by inventor name.

In a particular embodiment, the GUI 500 is displayed as a web-browser window within an Internet browser application, such as Internet Explorer, Mozilla, another web-browser application, or any combination thereof. Further, the GUI 500 can include other control elements, such as the visualization control element 534 to select between the table 530 and other visualizations, such as the graphical map shown in FIG. 4, a list view illustrated in FIG. 3, or other visualizations, including those indicated in the menu 420 illustrated in FIG. 4.

Figure 6:
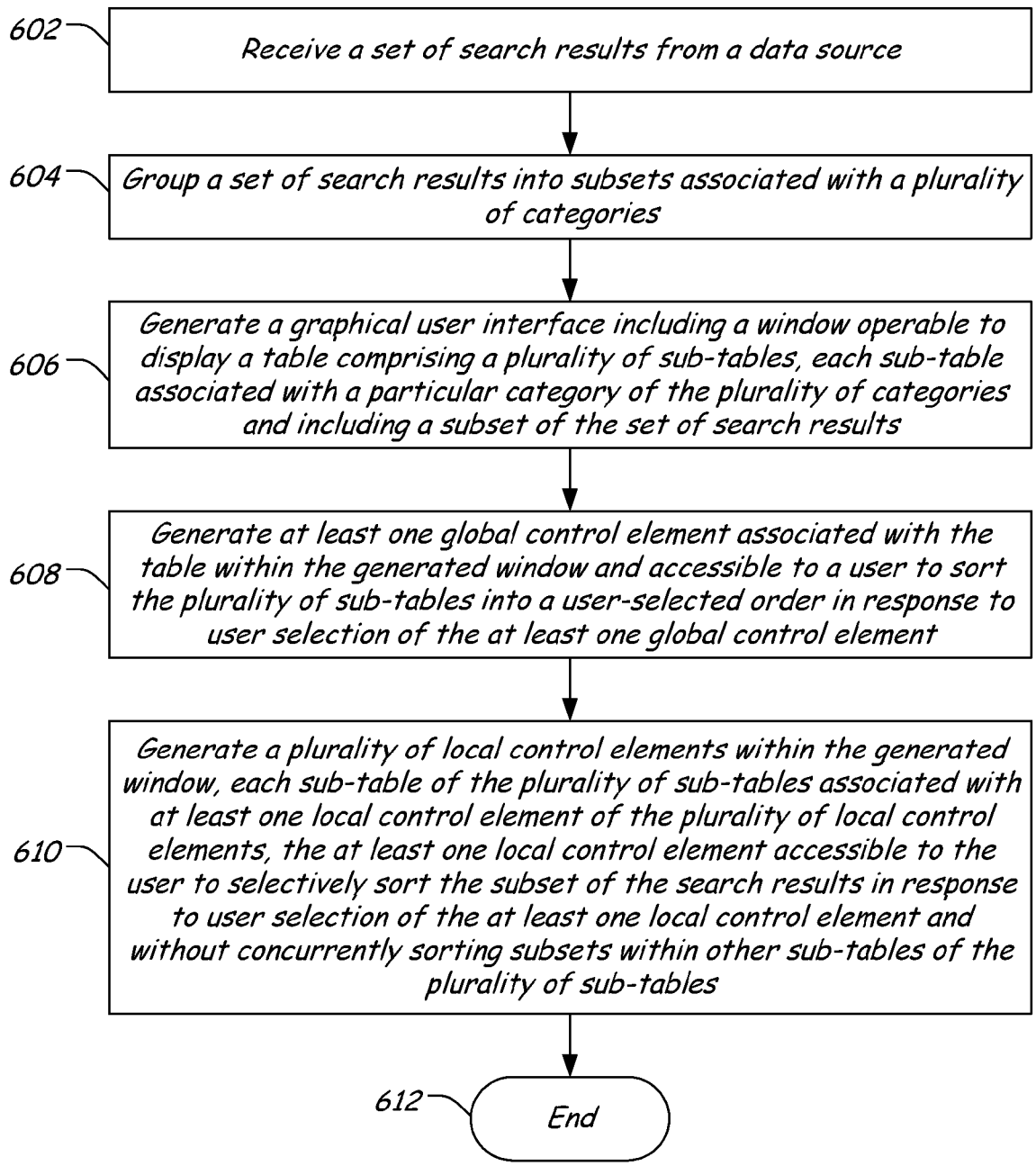
FIG. 6 is a particular illustrative embodiment of a method of providing searching results via a user-configurable table.

FIG. 6 is a particular illustrative embodiment of a method of providing searching results via a user-configurable table. At 602, a set of search results are received from a data source. The set of search results may be retrieved from local data sources, from network data sources, or any combination thereof. In a particular example, the set of search results may be provided from one or more search engines. Moving to 604, the set of search results are grouped into subsets associated with a plurality of categories. The categories can include company names, industry classifications, document classifications, financial classifications, geographical classifications, types of documents, other classifications, or any combination thereof. Further, the categories can be pre-defined categories, dynamically generated categories, other categories, or any combination thereof.

Advancing to 606, a graphical user interface is generated that includes a window operable to display a table comprised of a plurality of sub-tables, where each sub-table is associated with a particular category of the plurality of categories and includes a subset of the set of search results. Continuing to 608, at least one global control element is generated that is associated with the table within the generated window, and that is accessible to a user to sort the plurality of sub-tables into a user-selected order in response to a user selection of the at least one global control element. Proceeding to 610, a plurality of local control elements are generated within the generated window, where each sub-table of the plurality of sub-tables is associated with at least one local control element of the plurality of local control elements, and where the at least one local control element is accessible to the user to selectively sort the subset of the search results in response to user selection of the at least on local control element and without concurrently sorting subsets within other sub-tables of the plurality of sub-tables. The method terminates at 612.

It should be understood that the local control elements are associated with particular sub-tables to allow sorting of the subset of the search results within a particular sub-table independent from other subsets. Thus, each sub-table may be sorted according to different sort criteria, and the sub-tables may be reordered within the table, using the global control element, without altering the sort order within each of the sub-tables.

In conjunction with the systems and methods disclosed above with respect to FIGS. 1-6, a search system is disclosed that is adapted to provide search results within a graphical user interface having a table including multiple sub-tables, where each sub-table represents a particular categorization of the search results and where each sub-table includes a subset of the search results. Further, the search system is adapted to generate multiple user-selectable elements, including global control elements and local control elements. The global control elements are accessible to a user to alter an arrangement of the sub-tables within the table. The local control elements are accessible to a user to selectively alter an arrangement of subsets of the data within a particular sub-table without altering other subsets within other sub-tables. Further, the graphical user interface includes a user-selectable element for altering the visualization from a first visualization (such as the table having sub-tables) to a second visualization (such as a list view, a graphical map, another view, or any combination thereof). Further, the second visualization can include a table view organized into different categories from the first table view.

Although the present invention has been described with reference to preferred embodiments, workers skilled in the art will recognize that changes may be made in form and detail without departing from the spirit and scope of the invention.

What is claimed is:

1. A storage device embodying instructions that, when executed by a processor, cause the processor to generate a graphical user interface (GUI), the GUI comprising:

a search results window operable to display a set of search results within a table comprising a scrollable list of the set of search results presented in a plurality of rows, at least some of the plurality of rows including header rows, each header row including a label corresponding to a datum common to a subset of the search results and grouped with the subset to form a sub-table within the table such that the table includes including a plurality of sub-tables, each sub-table representing at least one category of a plurality of categories of information and including a respective subset of the set of search results;

a plurality of local control elements, each local control element associated with a respective one of the header rows and accessible to a user to selectively sort the respective subset of the set of search results within the respective sub-table into a new sort order according to a user-selected local sort parameter without altering a sort order of respective subsets of the set of search results within other sub-tables of the plurality of sub-tables; and a global sort element associated with the table and accessible to the user to selectively sort the plurality of sub-tables according to a user-selected global sort parameter.

2. The storage device of claim 1, wherein the global sort element comprises a context-based menu of sorting options related to one or more parameters associated with the set of search results.

3. The storage device of claim 1, wherein the plurality of categories comprises at least one of company names, industry classifications, document classifications, financial classifications, and geographic classifications.

4. The storage device of claim 1, wherein each local control element of the plurality of local control elements is accessible to the user to alter at least one of an arrangement and a content of a subset of the search results within a particular sub-table of the plurality of sub-tables.

5. The storage device of claim 1, wherein the GUI further comprises a global visualization element accessible to the user to change from a first visualization comprising the table representing the set of search results to a second visualization including a graphical map representing the set of search results.

6. The storage device of claim 1, wherein the GUI further comprises a global visualization element accessible to the user to change from a first visualization comprising a graphical map representing the set of search results to a second visualization including the table representing the set of search results.

7. The storage device of claim 6, wherein the graphical map comprises at least one of a geographic map representing geographical locations associated with each of the search results, a cluster chart representing subject matter relationships between the search results, and a corporation chart representing graphically relative numbers of the search results that are associated with each of a plurality of corporations identified in the set of search results.

8. The storage device of claim 1, wherein:
the GUI further comprises a first sub-table including a first subset of the set of search results having a first datum that is common to the first subset, the first datum comprising an assignee name; and
the label of the header row associated with the first subset includes the assignee name.

9. The storage device of claim 1, wherein the GUI further comprises the local control element of the first sub-table accessible by the user to sort the first subset within the sub-table according to an attribute of the first subset without altering the label.

10. The storage device of claim 9, wherein the attribute comprises one of a date, an author, and a document identifier.

11. A system to provide a user-configurable graphical user interface, the system comprising:
a processor; and
a memory accessible to the processor to store instructions comprising a plurality of instructions executable by the processor to:
group a set of search results into subsets according to a common datum;
generate window including a graphical user interface operable to display a table comprising a scrollable list of the set of search results organized into a plurality of rows, at least some of the plurality of rows including header rows, each header row including a label corresponding to a datum common to a subset of the search results and grouped with the subset to form a sub-table within the table such that the table includes a plurality of sub-tables;
generate at least one global control element associated with the table within the generated window and accessible to a user to sort the plurality of sub-tables into a user-selected order in response to user selection of the at least one global control element; and
generate a plurality of local control elements within the generated window, each sub-table table of the plurality of sub-tables associated with at least one local control element of the plurality of local control elements, the at least one local control element accessible to the user to selectively sort the subset of the search results grouped with header row into a new sort order in response to user selection of the at least one local control element and without concurrently sorting subsets within other sub-tables of the plurality of sub-tables.

12. The system of claim 11, further comprising a network interface coupled to a communications network and adapted to communicate the generated window to a remote device via the communications network.

13. The system of claim 12, wherein the plurality of instructions further comprises an instruction executable by the processor to process search results received from one or more data sources into the set of search results.

14. The system of claim 11, wherein the window further comprises a user-selectable element that is accessible to the user to alter a visual presentation of the set of search results from a first visualization comprising the table to a second visualization representing a dimension associated with the set of search results.

15. The system of claim 14, wherein:
the dimension includes an attribute defining a category of information within the set of search results; and
the second visualization comprises a second table view organized according to the category.

16. The system of claim 14, wherein the second visualization comprises a graphical map representing the dimension associated with the set of search results.

17. The system of claim 14, wherein the dimension comprises at least one of an industry classification, a financial parameter, a geographic location, and a document cluster map.

18. The system of claim 11, further comprising a display interface coupled to a display to provide the generated window to the display.

19. A search system comprising:
an interface responsive to a network to receive search results from one or more data sources;
a processor coupled to the interface; and
a memory accessible to the processor, the memory to store instructions that are executable by the processor, the instructions comprising:
a visualization generation module to generate a table comprising a spreadsheet view of the set of search results organized into a plurality of rows, at least some of the plurality of rows including header rows, each header row including a label derived from a datum common to a subset of the search results and grouped with the subset to form a sub-table within the table such that the table includes a plurality of sub-tables related to a respective plurality of categories;
an analysis module adapted to group the received search results into subsets of search results related to particular categories of the plurality of categories, each search result is associated with at least one of the plurality of categories; and
a graphical user interface (GUI) generation module to generate a GUI including the table, the GUI further comprising:
a first global control element accessible to a user to selectively sort the plurality of sub-tables into a first user-selected order based on the respective plurality of categories; and
a first local control element associated with a first sub-table of the plurality of sub-tables, the first local control element accessible to the user to selectively sort a first subset of the search results associated with the first sub-table into a new sort order without altering a second subset of the search results within a second sub-table.

20. The search system of claim 19, wherein the GUI further comprises a second local control element associated with a second sub-table of the plurality of sub-tables, the second local control element accessible to the user to selectively sort a second subset of the search results associated with the second-sub table without altering the first subset.

21. The search system of claim 20, wherein the first local control element is adapted to sort the first subset according to a first sort parameter, and wherein the second local control element is adapted to sort the second subset according to a second sort parameter.

22. The search system of claim 21, wherein the first and second sort parameters comprise an alphabetical order by title, an inventor name order, an author name order, an issue date order, a relevance order, a filing date order, and a claim count order.

23. The search system of claim 19, further comprising a global sort logic module responsive to user selection of the first global control element to alter an order associated with the categories and to apply the altered order to sort the plurality of sub-tables.

24. The search system of claim 19, further comprising a second global control element accessible to the user to switch from a first visualization of the search results comprising the table to a second visualization of the search results comprising a graphical map representing the search results.

25. The search system of claim 19, wherein the plurality of categories comprise at least one of a company name, an industry classification, a document classification, and a document source.

* * * * *